(12) United States Patent
Baranton

(10) Patent No.: US 8,231,220 B2
(45) Date of Patent: *Jul. 31, 2012

(54) METHOD OF MEASURING AT LEAST ONE GEOMETRICO-PHYSIONOMIC PARAMETER FOR POSITIONING A FRAME OF VISION-CORRECTING EYEGLASSES ON THE FACE OF A WEARER

(75) Inventor: Konogan Baranton, Charenton le Pont (FR)

(73) Assignee: Essilor International (Compagnie Generale d'Optique), Charenton-le-Pont (FR)

( * ) Notice: Subject to any disclaimer, the term of this patent is extended or adjusted under 35 U.S.C. 154(b) by 339 days.

This patent is subject to a terminal disclaimer.

(21) Appl. No.: 12/667,291

(22) PCT Filed: Jul. 4, 2008

(86) PCT No.: PCT/FR2008/000966
§ 371 (c)(1),
(2), (4) Date: Dec. 30, 2009

(87) PCT Pub. No.: WO2009/024681
PCT Pub. Date: Feb. 26, 2009

(65) Prior Publication Data
US 2010/0177186 A1    Jul. 15, 2010

(30) Foreign Application Priority Data

Jul. 26, 2007 (FR) .................................. 07 05475
Aug. 30, 2007 (FR) .................................. 07 06081

(51) Int. Cl.
*A61B 3/10* (2006.01)

(52) U.S. Cl. ......... 351/204; 351/246; 351/245; 351/200
(58) Field of Classification Search ................... 351/204, 351/245, 246
See application file for complete search history.

(56) References Cited

U.S. PATENT DOCUMENTS

| 4,653,881 A | 3/1987 | Joncour |
| 5,617,155 A | 4/1997 | Ducarouge et al. |

(Continued)

FOREIGN PATENT DOCUMENTS

FR    2 688 679    9/1993
(Continued)

OTHER PUBLICATIONS

International Search Report dated Apr. 1, 2009, from corresponding PCT application.

(Continued)

*Primary Examiner* — Khanh Dinh
(74) *Attorney, Agent, or Firm* — Young & Thompson

(57) ABSTRACT

The method includes capturing at least one digital image of the wearer's face with a portable image capture appliance (1) and processing the captured image to determine a geometrico-physionomic parameter. Before capturing the image, the operator positions the image capture appliance manually in a first configuration in which an observation line connecting the pupil (7) of the image capture appliance with a predetermined remarkable point associated with the wearer's face or with the frame is substantially horizontal. Image capture is performed in a second configuration of the image capture appliance such that the altitude of the image capture appliance is identical to its altitude in the first configuration. The calculation of the geometrico-physionomic parameter includes identifying on the image, the image of the predetermined remarkable point.

21 Claims, 4 Drawing Sheets

U.S. PATENT DOCUMENTS

| | | | |
|---|---|---|---|
| 6,922,494 B1 | 7/2005 | Fay | |
| 6,988,093 B2 * | 1/2006 | Pic et al. | 1/1 |
| 7,950,800 B2 * | 5/2011 | Nauche et al. | 351/204 |
| 2003/0101164 A1 * | 5/2003 | Pic et al. | 707/1 |
| 2010/0128220 A1 * | 5/2010 | Chauveau | 351/204 |

FOREIGN PATENT DOCUMENTS

| | | |
|---|---|---|
| FR | 2 719 463 | 11/1995 |
| FR | 2 860 417 | 4/2005 |
| FR | 2 860 887 | 4/2005 |
| JP | 2005185431 A | 7/2005 |

OTHER PUBLICATIONS

European Office Action, dated Mar. 8, 2012, from corresponding European application No. 08 775 613.6.

* cited by examiner

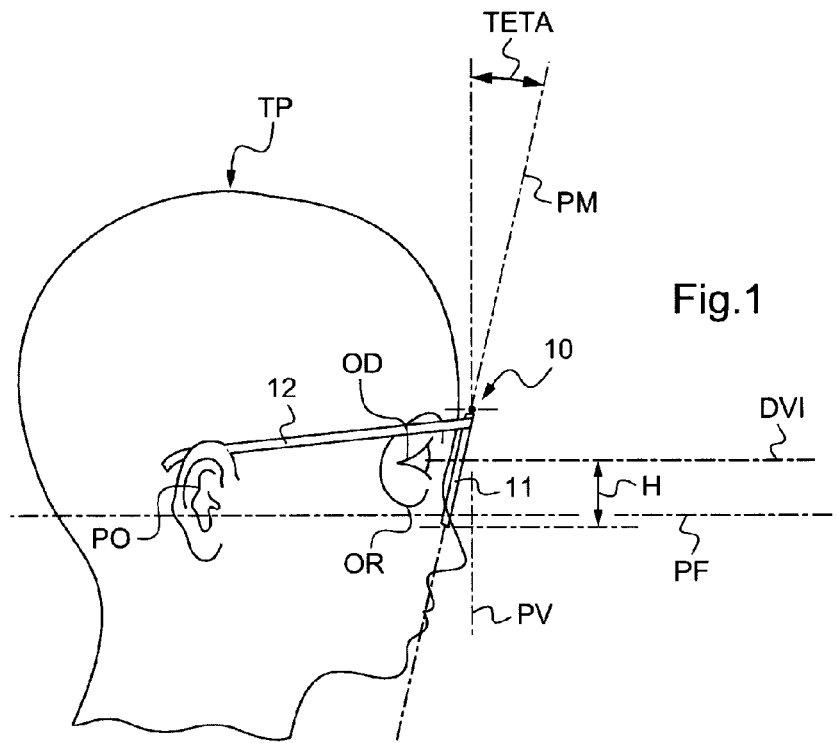
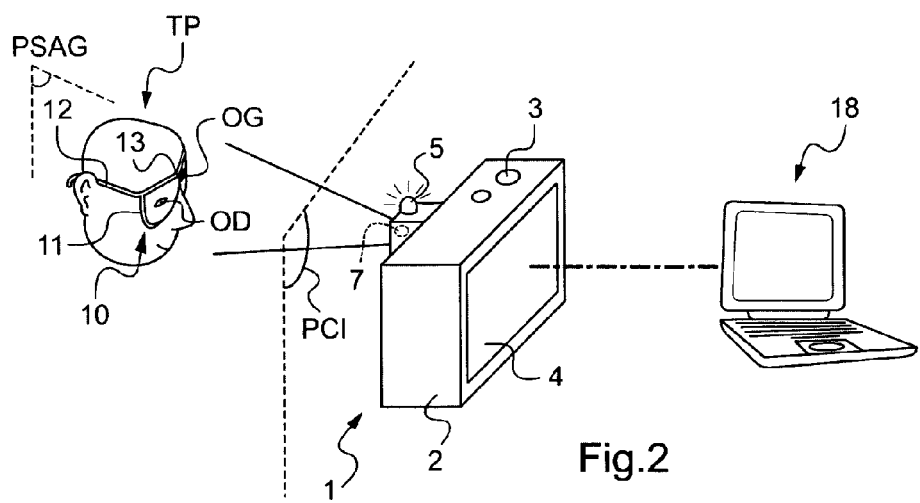

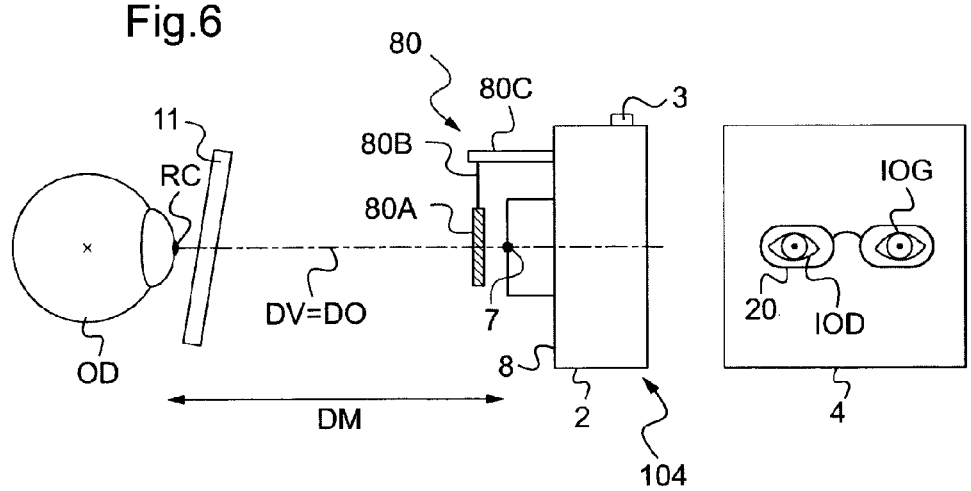
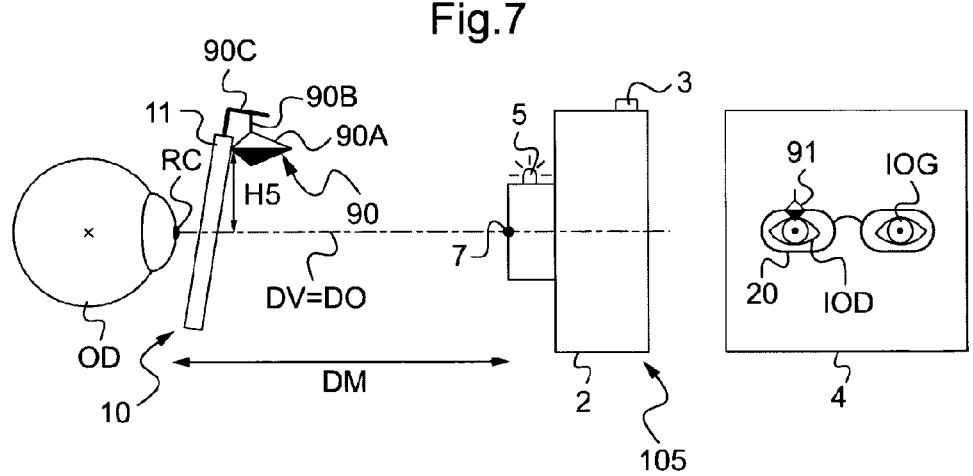

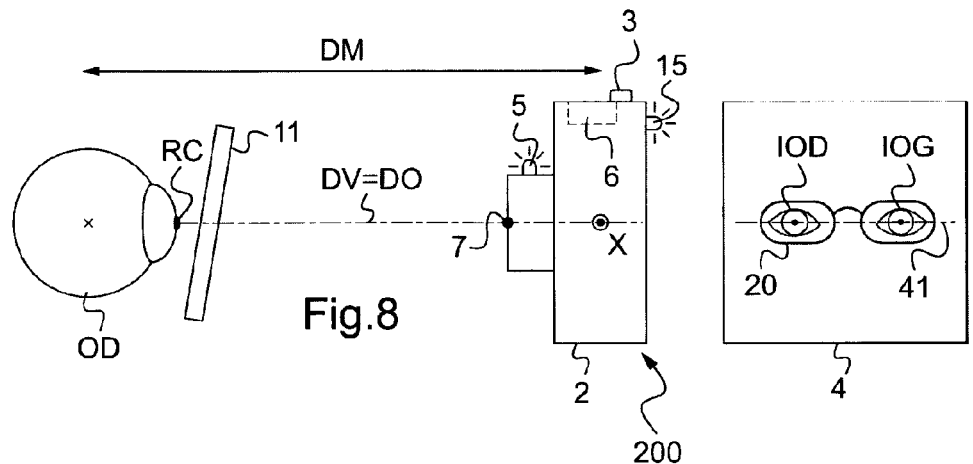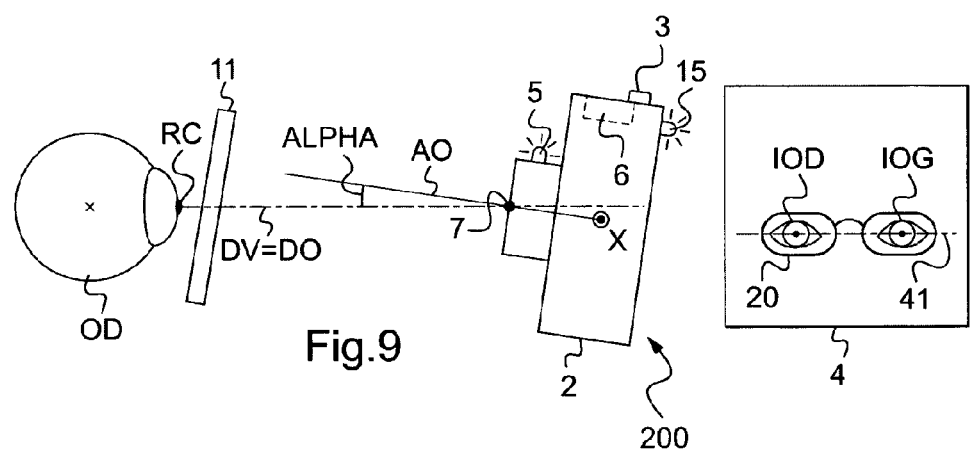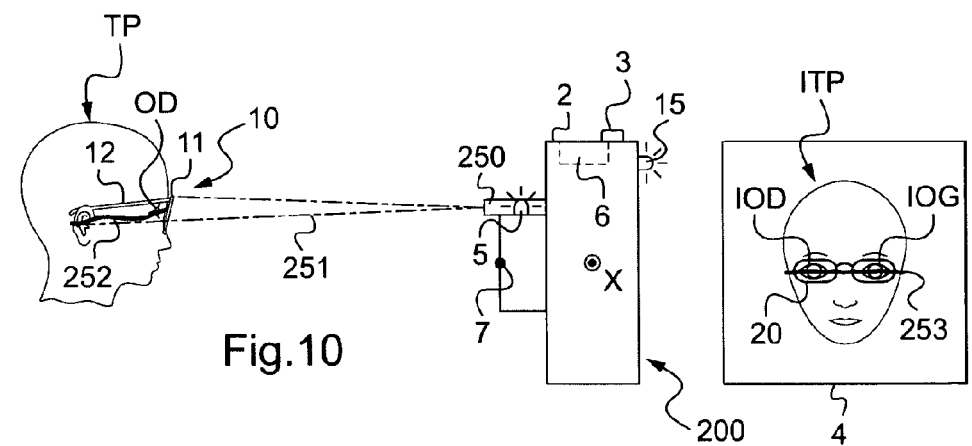

METHOD OF MEASURING AT LEAST ONE GEOMETRICO-PHYSIONOMIC PARAMETER FOR POSITIONING A FRAME OF VISION-CORRECTING EYEGLASSES ON THE FACE OF A WEARER

TECHNICAL FIELD TO WHICH THE INVENTION RELATES

The present invention relates in general to preparing vision-correcting eyeglasses, and more precisely to the taking of geometrico-physionomic measurements by the optician on the wearer while wearing selected frames in order to determine data relating to the positioning configuration for the correcting lenses in front of the wearer's eyes.

TECHNOLOGICAL BACKGROUND

Preparing a corrective lens for eyeglasses comprises firstly a step of optically designing and shaping the refractive faces of the lens, and secondly a step of adapting the lens so that it fits the selected frame.

The present invention relates to measuring geometrico-physionomic parameters on the wearer's face that enable account to be taken of the configuration in which the eyeglasses are positioned on the wearer's face. These parameters are likely to be used in both of the steps of preparing a corrective lens so as to ensure that the lens ends up performing the corrective optical function for which it is designed and prescribed. These parameters include, for example, the heights of the centers of rotation of the eyes and the pantoscopic angle of inclination formed by the general plane of the frame or the à relative to the vertical.

In order for these parameters to be taken into account effectively, they need to be measured with care and accuracy, and that is found to be difficult in practice. To rationalize the taking of measurements, proposals have made for measurements to be taken from digital photographs of the wearer's face wearing the frame. Thus, by way of example, the pupillary distance and the pupil height can be measured by processing a digital front-view image of the wearer's face.

One known image capture appliance is mounted so as to be movable vertically on a stand column that ensures that the optical axis of the lens of the image capture appliance remains horizontal and can be adjusted to have the same altitude as the wearer's eyes so as to enable accurate measurement to be obtained of the geometrico-physionomic parameters of the wearer.

Nevertheless, the resulting measurement-taking device is found to be relatively bulky and not very ergonomic for use on sales' premises. The measurement-taking protocol is perceived as being relatively constricting, lengthy, and fiddly both by the wearer and by the optician. That device is also very expensive.

OBJECT OF THE INVENTION

The object of the present invention is to remedy the above-mentioned drawbacks in full or in part by proposing a measurement method that is fast and flexible, making use of a portable image-capture appliance without a stand column, and making it possible to take accurate measurements of the geometrico-physionomic parameters of the wearer.

To this end, the invention provides a method of measuring at least one geometrico-physionomic parameter concerning the positioning on the face of a wearer of a frame for vision-correcting eyeglasses, the method comprising capturing at least one digital image of the wearer's face wearing the frame by using an image sensor such as an image capture appliance, and processing the captured image to determine the geometrico-physionomic parameter, wherein the image capture appliance is of the portable type held in the hand by an operator, and prior to capturing an image, the operator manually positions the image capture appliance in a first configuration in which a line of observation connecting the pupil of the image capture appliance to a predetermined remarkable point directly or indirectly associated with the wearer's face or with the frame is substantially horizontal, wherein the image is captured in a second configuration of the image capture appliance identical to or distinct from the first configuration, such that the altitude of said image capture appliance is identical to its altitude in the first configuration, and wherein the calculation of the geometrico-physionomic parameter includes identifying, in the image, the image of the predetermined remarkable point.

This method makes use of an image capture appliance that is portable, and therefore compact, and that may be constituted by a consumer pocket digital camera, and therefore be inexpensive.

Research work undertaken by the Applicant in the context of the invention has shown that using such a portable image capture appliance for measuring geometrico-physionomic parameters of a wearer is made difficult because of the inaccuracy of the measurements obtained. That work has shown that the inaccuracy is due to a great extent to vertical parallax errors when capturing the image, which errors have the effect, in particular, of reducing the accuracy of the measurements of pupil height relative to the selected frame, and also the measurement of the pantoscopic angle.

The method of the invention guarantees that the image is captured in a configuration in which the line of observation of the image capture appliance is substantially horizontal, i.e. horizontal to within an angle of +/−5 degrees. While capturing an image, this avoids any vertical parallax error that would otherwise run the risk of affecting, in particular, the measured heights of the eyes, thereby making it possible, after image processing, to obtain an accurate measurement of the looked-for geometrico-physionomic parameters.

In a first family of implementations of the method of the invention, in order to position the image capture appliance in the first configuration, the operator adjusts the altitude of the image capture appliance by means of a visual assistance device including at least one illuminated object pendulumn-suspended either from the image capture appliance, or directly or indirectly from the wearer's head.

The term "illuminated object" is defined herein as being an object that constitutes a direct or an indirect source of light. It may comprise an active light source (white lamp, light-emitting diode (LED), or infrared source, for example), a reflective object (e.g. a mirror), or indeed an object that diffuses ambient light.

An object is said to be pendulumn-suspended when it is mounted to pivot about a horizontal pivot axis and is urged, typically by gravity or by a gyroscopic or equivalent effect, towards a predetermined absolute return position relative to the horizontal. Preferably, damper means are provided to damp the pivoting of the illuminated object so as to ensure that it stabilizes quickly or that it remains stably in its return position.

The image capture appliance is then positioned simply and quickly with the help of the assistance device that enables the operator to act manually and quickly, at sight, to adjust the pupil of the appliance on substantially the same altitude as the wearer's eyes, without needing to take any measurements.

According to an advantageous characteristic of the first family of implementations of the invention, the illuminated object is an active source of extent that is limited at least in the vertical direction, or a reflecting object pendulumn-suspended directly or indirectly from the wearer's head, the operator views an image to be captured in real time on viewing means of the image capture appliance, and the operator adjusts the altitude of the image capture appliance in such a manner that the image of said illuminated object is visible on the image to be captured.

The active directional light source may for example be a light pointer. In this implementation, the light beam is directional, i.e. of small extent in the vertical direction. The altitude of the pointer relative to the wearer's eyes and the direction of the light are predetermined so that, at the usual image-capture distance, if the beam is visible on the viewing means of the appliance, that indicates that the pupil of the appliance and the wearer's eyes are at substantially the same altitude.

The reflecting object may be a small mirror of altitude relative to the wearer's eyes that is predetermined so that the reflection in said mirror of a predefined mark situated on the image capture appliance can be seen on the viewing means of the image capture appliance only if the pupil of the image capture appliance and the wearer's eyes are at substantially the same altitude. Said mark may advantageously be an illuminated object.

According to another advantageous characteristic of the first family of implementations of the invention, the illuminated object is an active source or a light-diffusing object pendulumn-suspended directly or indirectly from the wearer's head, the operator views an image to be captured in real time on the viewing means, and the operator adjusts the altitude of the image capture appliance in such a manner that the image of the illuminated object is visible in the image to be captured, and the image of said illuminated object viewed on the viewing means presents geometrical characteristics of predefined shapes and/or dimensions and/or colors.

The active illuminated source or diffusing object may for example be a prism presenting top and bottom faces of different colors. Depending on the sizes of the surfaces of each color as seen on the viewing means of the image capture appliance, the operator can evaluate the altitude of the pupil of the image capture appliance relative to the altitude of the prism and then correct it in such a manner that the pupil of the image capture appliance takes up substantially the same altitude as the wearer's eyes.

Under such circumstances, and advantageously, the illuminated object is situated at a distance of less than 10 centimeters from the wearer's eyes, or such that an orientation line connecting an optical center of said illuminated object and the pupil of the image capture appliance placed at the same altitude as the wearer's eyes forms an angle lying in the range +5 degrees to −5 degrees with its projection onto a horizontal plane.

This position of the illuminated object relative to the wearer's eyes and to the pupil of the image capture appliance ensures that the method enables the wearer's eyes and the pupil of the image capture appliance to be placed at substantially the same altitude.

According to another advantageous characteristic of the first family of implementations of the invention, the illuminated object is a reflecting object pendulumn-suspended from the image capture appliance and that is situated in front of or close to the pupil of the image capture appliance, and the operator adjusts the altitude of the image capture appliance in such a manner that the wearer sees the reflection of his or her own eyes in said reflecting object.

Under such circumstances, and advantageously, the reflecting object is a half-silvered mirror placed in front of the pupil of the image capture appliance.

The wearer tells the operator when the image capture appliance is at an altitude such as to enable the wearer to see his or her own eyes in the half-silvered mirror, and the operator then merely needs to trigger image capture. This ensures that the line of observation is accurately horizontal.

According to another advantageous characteristic of the first family of implementations of the invention, the illuminated object is an active light source, that is pendulumn-suspended from the image capture appliance, and the operator adjusts the altitude of the image capture appliance by adjusting the altitude of the projection onto the wearer's face of the light beam emitted by the illuminated object relative to the remarkable point of the wearer's face.

The operator has no need to use the viewing means of the image capture appliance. Adjustment is very quick.

According to another advantageous characteristic of the first family of implementations of the invention, the illuminated object is an active light source that is pendulumn-suspended from the image capture appliance, the operator views in real time an image to be captured on the viewing means, and the operator adjusts the altitude of the image capture appliance by adjusting the vertical position on the image to be captured of the image of the projection onto the wearer's face of the light beam emitted by the illuminated object relative to the image of the remarkable point of the wearer's face.

According to another advantageous characteristic of the first family of implementations of the invention, the visual assistance device includes an active light source that is pendulumn-suspended from the image capture appliance and a reflecting object that is pendulumn-suspended directly or indirectly from the wearer's head, the operator viewing in real time an image to be captured on the viewing means, and the operator adjusts the altitude of the image capture appliance in such a manner that the reflection of said active light source on said reflecting object is visible in the image to be captured.

By way of example, the reflecting object may be a small mirror, a white screen, or a catadioptric reflecting film, of altitude relative to the active illuminated source, e.g. constituted by an LED mounted on the digital capture appliance, that is predetermined so that if the reflection of the LED is visible on the viewing means of the image capture appliance, the pupil of the image capture appliance and the wearer's eyes are at substantially the same altitude.

In a second family of implementations of the method of the invention, the manual positioning of the image capture appliance includes delivering information to the operator for compensating the tilt angle formed between an optical axis of the image capture appliance and its projection onto a horizontal plane.

In order to position the image capture appliance in such a manner that the sighting line is horizontal, the operator corrects the tilt angle of the image capture appliance.

Under such circumstances, and advantageously, the manual positioning of the image capture appliance comprises the following substeps:

a1) measuring the tilt angle by means of on-board tilt-measuring means fitted to the image capture appliance;

a2) the operator adjusting said tilt angle; and a3) the operator viewing in real time an image to be captured on the viewing means, the operator adjusting the altitude of the image capture appliance to adjust the vertical position of a remarkable point of the image to be captured of the wearer's face viewed by the operator on the viewing means relative to a reference of the viewing means or relative to the image of the projection on the wearer's face of an active light pointer secured to the image capture appliance to a given value, which given vertical position value is defined on calibration or dynamically as a function of the tilt angle after adjustment.

By way of example, these tilt measurement means may be an electronic tilt meter or a spirit level enabling the operator to adjust the tilt angle to a given value. The operator then corrects the altitude of the image capture appliance so as to place the pupil of the image capture appliance at the same altitude as the selected remarkable point of the wearer's face, e.g. the wearer's eyes.

For this purpose, it is possible for example to adjust the vertical position of the images of the wearer's eyes relative to the frame of reference of a screen used as the viewing means, or to adjust the vertical position on said image to be captured of the images of the wearer's eyes relative to the vertical position of the image of a light beam projected onto the wearer's face by an active light pointer secured to the image capture appliance.

The adjustment of the vertical position of the images of the wearer's eyes depends on the tilt angle of the image capture appliance.

According to an advantageous characteristic of the second family of implementations of the invention, for manual positioning of the image capture appliance, the operator adjusts the tilt angle and said vertical position of the remarkable point of the image to be captured to have predetermined values.

In order to place the line of observation of the image capture appliance in a substantially horizontal position, the operator positions the appliance in such a manner that the tilt angle and the vertical position of the wearer's eyes on the image to be captured presents predetermined values. These adjustments may be performed in any order or simultaneously.

According to another advantageous characteristic of the second family of implementations of the invention, for manual positioning of the image capture appliance, information means depending on the on-board tilt-measuring means inform the operator about the angular position of the image capture appliance relative to a predetermined value for the tilt angle.

The optician is given information in real time to enable the tilt angle of the camera to be adjusted easily.

According to another advantageous characteristic of the second family of implementations of the invention, said predetermined value for the tilt angle is zero.

Image capture is then performed in a configuration in which the optical axis of the image capture appliance is horizontal and in which the pupil of said appliance is at substantially the same altitude as the wearer's eyes.

According to another advantageous characteristic of the second family of implementations of the invention, the altitude of the image capture appliance is adjusted by putting crosshairs placed on the viewing means into the same vertical position as the remarkable point of the image to be captured of the wearer's face viewed by the operator on the viewing means.

Thus, the vertical position of the images of the wearer's eyes on the viewing means relative to the frame of reference of the viewing means is easily adjusted to an accurate value by superposing the images of the wearer's eyes on the crosshairs, which crosshairs are in a position that is determined for a given tilt angle.

According to another advantageous characteristic of the second family of implementations of the invention, said crosshairs are dynamically inlaid by digital display means forming part of the viewing means, on the image to be captured at a vertical position that is adjusted in real time by digital processing as a function of the tilt angle measured by the on-board inclination-measurement means.

Thus, the tilt angle and the vertical position of the images of the wearer's eyes on the viewing means relative to the frame of reference of the viewing means are adjusted simultaneously by superposing the images of the wearer's eyes on the crosshairs, with the vertical position of the crosshairs in the frame of reference of the viewing means being adjusted in real time as a function of the tilt angle measured by the tilt meter.

According to another advantageous characteristic of the second family of implementations of the invention, the altitude of the image capture appliance is adjusted by putting the image of the projection on the wearer's face of an active pointer secured to the image capture appliance into the same vertical position as the remarkable point of the image to be captured of the wearer's face viewed by the operator on the viewing means.

Thus, the altitude of the image capture appliance is easily adjusted to an accurate value by positioning the capture appliance in such a manner that the illuminated active pointer illuminates a determined remarkable point of the wearer's face for a given tilt angle.

According to another advantageous characteristic of both families of implementations of the invention, the wearer gazes at a sighting point that, together with one of the wearer's eyes, forms a line of sight that is substantially horizontal.

Under such circumstances, and advantageously, the sighting point is carried by the image capture appliance and is vertically separated from the pupil of the image capture appliance by a height of less than 10 centimeters, or such that in the first configuration, the line of sight forms an angle less than or equal to 6 degrees with its projection onto a horizontal plane.

Thus, with the wearer gazing at the sighting point situated on the image capture appliance close to the pupil of the appliance, it is possible with a first order approximation to assume that the line of observation coincides with the line of sight. The operator then adjusts the height and the tilt angle of the appliance so that the line of observation and thus the line of sight are substantially horizontal. The image capture appliance is then at the same altitude as the wearer's eyes. The wearer is then more advantageously in a natural orthostatic posture.

DETAILED DESCRIPTION OF AN IMPLEMENTATION

The following description with reference to the accompanying drawings given by way of non-limiting example makes it clear what the invention consists in and how it can be reduced to practice.

In the accompanying drawings:

FIG. 1 is a side view of the head of a wearer, with a pair of eyeglasses placed thereon;

FIG. 2 is a general diagrammatic perspective view of an image capture appliance used for measuring geometrico-physionomic positioning parameters of eyeglasses on the face of the wearer in accordance with the invention;

Figure 3:
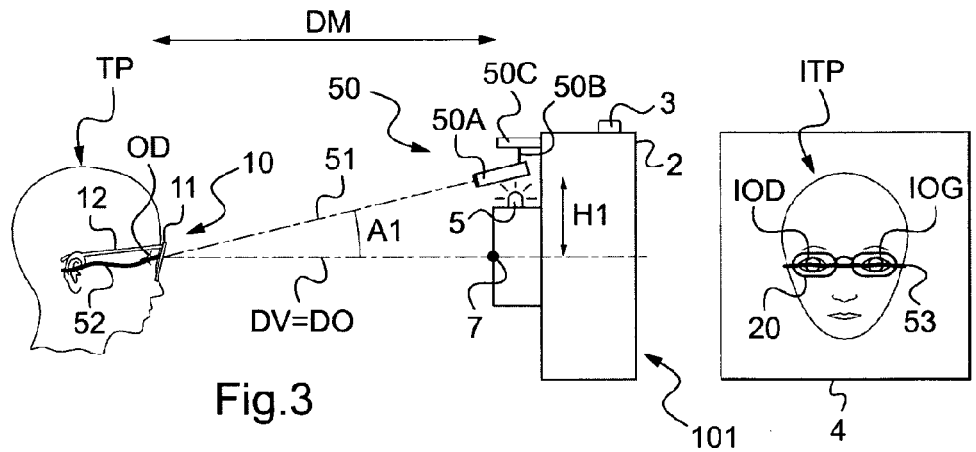

FIGS. 3 to 7 are diagrammatic detail views in profile elevation with deformed proportions to make them easier to read, showing how a front image of the frame and of the wearer's eye is captured in several variants of a first family of implementations of the measurement method in accordance with the invention; and FIGS. 8 to 10 are diagrammatic views in profile elevation with deformed proportions to make them easier to read, showing how a front image of the frame and of the eye is captured in several variants of a second family of implementations of the measurement method in accordance with the invention.

Firstly, it should be observed that elements that are common to different figures are identified, wherever possible, by identical references and are not described in detail for each figure.

As shown in FIGS. 1 and 2, the wearer is fitted with a frame 10 previously selected by the wearer and on which lenses are to be mounted to exert an eyesight correction optical function in accordance with a prescription. The frame 10 conventionally comprises two rims 11 interconnected by a nose bridge 13, and associated with two temples 12. Each rim 11 is placed in front of a respective eye OD, OG of the wearer, and lies in a mean plane PM that, in profile view, forms a vertical angle of inclination TETA [i.e. theta] with a vertical plane PV (e.g. passing through the nose bridge 13) about a horizontal direction perpendicular to a sagittal plane PSAG of the wearer's head TP. This angle TETA is commonly referred to as the pantoscopic angle.

The sagittal plane PSAG, also referred to as the median plane of the wearer's head TP is parallel to the panel of FIG. 1 and is shown diagrammatically in FIG. 2.

Here the purpose is to determine accurately from a front image of the wearer various geometrico-physionomic parameters of the wearer's head TP and of the frame 10, such as for example the pantoscopic angle TETA or the height H of the pupils of the wearer's eyes relative to the bottom edge of the frame 10, for the purpose of implementing personalized design and/or adaptation of the pair of corrective lenses to the physiognomy of the wearer's head and to the shape of the frame 10, in conformity with the desired optical correction function.

For this purpose, a pupil 7 of the image capture appliance 1 is placed by the method of the invention at the same altitude as the wearer's eyes at the time the image is captured.

In the so-called "natural" orthostatic posture of the wearer, as shown in FIG. 1, the wearer is in a sitting or standing configuration such that the head TP is straight, i.e. Frankfort's plane PF relating to the wearer's head is substantially horizontal. As shown in FIG. 1, Frankfort's plane PF is defined as the plane containing the wearer's lower orbit points OR and porion PO, where the porion is the high point of the acoustic meatus, corresponding to the tragion of the ear. The gaze axis or the line of sight of the wearer DV is then the horizontal primary gaze axis DVI corresponding to the wearer looking straight ahead at the horizon at infinity.

FIG. 2 shows an image capture appliance 1 used for performing the method of the invention for measuring individual geometrico-morphological parameters of a wearer fitted with a pair of presentation eyeglasses.

The image capture appliance 1 is digital and is similar to a consumer pocket digital camera, comprising a housing 2, a trigger button 3, and means for viewing the image to be captured, including a viewfinder screen 4.

In a variant, it would be advantageous for the image capture appliance to be a video camera or a camera for taking a burst of images in rapid succession in order to provide a plurality of exposures from which it is possible to calculate a mean, or to apply filtering, or indeed to select the most pertinent exposure.

In any event, the image capture appliance 1 is suitable for being handled by the optician to capture, in a face-view image-capture plane PCI, an image of the wearer's face wearing the frame 10. This plane is said to be a face-view plane in that it is perpendicular to the sagittal plane PSAG and to Frankfort's plane PF of the wearer's head TP.

The image capture appliance 1 also possesses means for communicating with a computer 18 fitted with corresponding communications means. The communications means of the image capture appliance 1 and of the computer 18 are of the wired or wireless type, and since they are of any commonplace design, they are not described. Advantageously, these communications means are incorporated within a common network architecture or a point-to-point link enabling the image capture appliance 1 to communicate with a plurality of computers.

In a first family of implementations of the method of the invention, the image capture appliance 101; 102; 103; 104; 105 that is used includes a visual assistance device including at least one illuminated object pendulumn-suspended either from the image capture appliance 101; 102; 103; 104; 105 or directly or indirectly from the wearer's head TP.

In a first implementation of this first family, as shown in FIG. 3, the image capture appliance 101 is similar to the image capture appliance 1 shown in FIG. 2 and is used in the context described with reference to FIG. 2. It thus comprises a housing 2, a trigger button 3, and means for viewing the image to be captured, including a viewfinder screen 4. It also includes a light source 5 such as an LED suitable for attracting the wearer's gaze. The LED 5 is adjacent to the pupil 7 of the image capture appliance 101 and it represents the sighting point of the image capture appliance 101. It is placed in such a manner that the line of sight DV interconnecting the sighting point and the wearer's eyes under image-capture conditions forms relative to its projection on a horizontal plane an angle that is less than or equal to 6 degrees.

For example, if the image-capture distance DM between the wearer and the image capture appliance 101 is about 1 meter, the LED 5 constituting the sighting point is placed at a height that is less than 10 centimeters from the pupil 7 of the image capture appliance 101. In practice, given the usual diameter of the pupil 7 of the image capture appliance 101, the sighting point is situated at about 30 millimeters from said pupil 7. If the wearer gazes at the LED 5, it can be assumed, to an approximation of first order, that the wearer's line of sight DV coincides with the observation line DO of the image capture appliance 101.

A remarkable point RC of the wearer's face is represented in this example by the pupil RC of one of the wearer's eyes OD, OG.

In this example, the image capture appliance 101 is fitted with an active light source 50 constituted by a light pointer 50A that emits a directional light beam 51 of small aperture angle in the vertical direction, such that the thickness of the beam in the vertical direction is for example about 1 millimeter to 10 millimeters at the usual image-capture distance DM that is about 1 meter. The projection of the light beam emitted by the pointer onto a vertical plane is thus represented by a straight line.

The light pointer 50A is pendulumn-suspended freely from the image capture appliance 101; it is mounted on the housing 2 of the image capture appliance 101 to pivot freely about a horizontal pivot axis that is substantially perpendicular to the optical axis of the image capture appliance. For example, the light pointer 50A is attached to the bottom end of a tape or a pivoting rod 50B having its top end connected to a projection 50C cantilevered out from the front face 8 of image capture appliance 101 and secured thereto. The direction of the light beam 51 thus remains known and constant relative to the horizontal plane, regardless of the angle of inclination of the image capture appliance 101. Preferably, damper means are provided between the light pointer 50A and the image capture appliance 101 so as to avoid unwanted oscillations of the pointer.

The light pointer 50A is mounted at a distance H1 from the pupil 7 of the image capture appliance 101 that is preferably less than 20 centimeters, or such that the angle A1 between the beam emitted by the pointer 50 and its projection on a horizontal plane lies in the range +11 degrees to −11 degrees. The angle of inclination of the light pointer 50A relative to the horizontal is then adjusted so that at the image-capture distance DM of about 1 meter, the altitude of the light beam 51 coincides with the altitude of the pupil 7 of the image capture appliance 101, and the projection of said beam on a vertical plane is horizontal. The angle of inclination of the light pointer 50A in its equilibrium position, represented by angle A1 in FIG. 3, then makes it possible to compensate the distance H1 between the pupil 7 of the image capture appliance 101 and the pointer 50A.

In a variant, it is possible to envisage that the light pointer 50A is mounted very close to the pupil 7 of the image capture appliance 101, and preferably in such a manner that the light beam 51 it emits extends in a mean plane that is horizontal. For example, it is positioned at substantially the same altitude as the pupil 7 of the image capture appliance 101. A horizontal plane close to that containing the pupil 7 of the image capture appliance 101 is then advantageously marked by the light beam 51.

In a variant, it is possible to envisage using a light pointer that emits a beam presenting small section in both the horizontal and the vertical directions.

In practice, measurement takes place as follows.

The operator positions the pair of presentation eyeglasses 10 on the wearer's face. The wearer is sitting or standing with the head straight.

The operator takes hold of the image capture appliance 101 and frames the wearer's face. The operator lights the LED 5 by pressing the trigger button 3 down to a first level and asks the wearer to gaze at the sighting point embodied by the LED 5. The operator then activates the light pointer 50 which projects a line of light 52 on the wearer's head TP.

The operator positions the image capture appliance in a first configuration by adjusting the altitude of the image capture appliance 101 in such a manner that the vertical position of the image 53 of this line of light on the image ITP of the wearer's head viewed on the viewfinder screen 4 is identical to the vertical positions of the images IOD and IOG of the wearer's eyes as viewed on the viewfinder screen 4.

Alternatively, the operator adjusts the altitude of the image capture appliance 101 in such a manner that the difference between the vertical position of the image 53 of this line of light viewed on the viewfinder screen 4 and the vertical positions of the images IOG and IOD of the wearer's eyes as viewed on the viewfinder screen 4 presents a value that is predetermined.

In a variant, the operator adjusts the altitude of the image capture appliance 101 so that the line of light 52 is superposed on the wearer's eyes on the wearer's face, also so that the spacing between the line of light 52 and the wearer's eyes has a value that is predetermined.

In another variant, the light pointer 50A is replaced by an infrared pointer. The infrared beam is projected onto the wearer's face along a line that can be seen in red on the viewfinder screen 4 of the image capture appliance 101, since the image sensors of digital image capture appliances are sensitive in the infrared wavelength range near to visible wavelengths (in the range 0.7 micrometers to 1.5 micrometers). The wearer cannot see the infrared beam and is therefore not dazzled by the light as happens when using a visible light beam.

The operator then adjusts the altitude of the image capture appliance 101 so that the vertical position of the image of the projection of the infrared beam that can be seen in red on the viewfinder screen 4 is identical to the vertical position of the images IOD, IOG of the wearer's eyes as viewed on the viewfinder screen 4.

In another variant, the visible or infrared light beam may be switched off after adjusting the altitude of the image capture appliance 101, prior to capturing the image, so as to avoid wearer discomfort.

The operator then triggers image capture by means of the trigger button 3. During this image capture, the image capture appliance 101 is held by the operator in a second configuration that is the same as the above-mentioned first configuration. Nevertheless, for greater flexibility in use or for the purpose of taking a specific exposure, provision may alternatively be made for the operator to place the image capture appliance 101, while capturing the image, in a second configuration that is distinct from the first configuration, by modifying the angle of inclination of the image capture appliance 101, but without modifying its altitude.

Typically, the pupil of the image capture appliance can then be offset horizontally and/or the optical axis of the image capture appliance need not be horizontal but may be slightly oblique, providing the images IOD and IOG of the wearer's eyes and the image 20 of the eyeglasses remain visible on the viewfinder screen 4 of the image capture appliance 101.

In any event, the image is thus captured in a configuration in which the pupil 7 of the image capture appliance 101 and the wearer's eyes OD, OG are in a plane that is substantially horizontal, and thus at the same altitude. It is assumed both in this implementation and in all of the implementations described, that the pupil 7 of the image capture appliance 101 and the wearer's eyes OD, OG are at substantially the same altitude when the line of observation DO interconnecting the pupil 7 and one of the wearer's eyes OD forms an angle lying in the range +5 degrees to −5 degrees with its projection onto a horizontal plane, thereby eliminating any vertical parallax error, in particular on the vertical positioning of the eyes relative to the frame 10. It will be understood that because of the non-zero distance that exists between the mean plane of the frame 10 and the eyes of the wearer, too great an angle of inclination for the line of observation DO would give rise to a vertical parallax error in the captured image.

Furthermore, since the line of sight DV in this implementation coincides with the line of observation DO, the wearer's line of sight DV is also horizontal, thereby ensuring that the wearer is in a natural orthostatic posture.

The image capture appliance 101 then transmits the image as captured in this way to the computer 18 that stores it in random access memory (RAM) or in mass memory, in order to enable it to be processed by the processing and calculation software installed in the computer 18. Such processing is known and is not described in detail herein.

By using the software for processing the captured image, the computer 18 uses the captured image in isolation or in combination with other images captured in other configurations to calculate at least one of the looked-for geometrico-physionomic parameters. By way of example, the parameter is the height H of the wearer's pupils RC relative to the frame 10, the wearer's pupillary distance, or the pantoscopic angle TETA of the frame 10.

Figure 4:
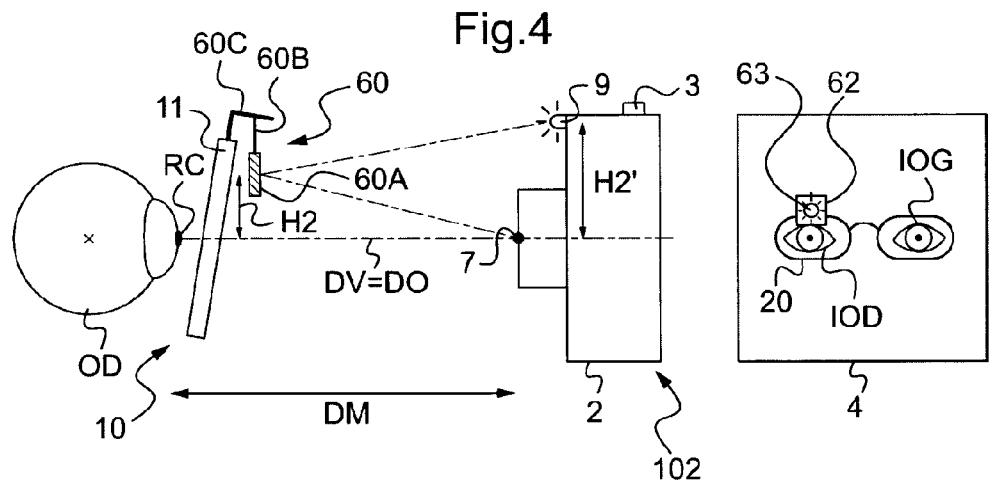

In a second implementation of the first family, shown in FIG. 4, the image capture appliance 101 is similar to the image capture appliance 1 shown in FIG. 2 and it is used in the context described with reference to FIG. 2. It thus comprises a housing 2, a trigger button 3, and means for viewing the image that is to be captured, including a viewfinder screen 4. It also includes a light source 9 such as an LED that is suitable for attracting the wearer's gaze. The LED 9 is adjacent to a pupil 7 of the image capture appliance 102, and it represents the sighting point of the image capture appliance 102. Like the LED 5 in the first implementation, it is placed in such a manner that the line of sight DV interconnecting the sighting point and the wearer's eyes in image capture conditions forms an angle that is less than or equal to 6 degrees with its projection onto a horizontal plane. The distance H2' between the LED 9 and the pupil 7 of the image capture appliance 102 is thus preferably less than 10 centimeters.

If the wearer gazes at the LED 9, and to an approximation of first order, it can be assumed that the line of sight DV of the wearer coincides with the line of observation DO of the image capture appliance 102.

The remarkable point RC of the wearer's face is represented in this implementation by the pupil RC of one of the wearer's eye OD.

The frame 10 selected by the wearer is fitted in this implementation with a small pendulumn-suspended mirror 60. The suspended mirror 60 has a mirror 60A with a size of about 3 centimeters vertically and 5 centimeters lengthwise, and it is attached for example to a tape or to a pivotally-mounted rod 60B that is connected to a projection 60C cantilevered out above the frame 10. The suspended mirror 60 is releasably secured to one of the rims 11 of the frame 10, e.g. by clip-fastening, or by means of a diadem, or by any other means known to the person skilled in the art.

Alternatively, the suspended mirror 60 may equally well be mounted directly on the wearer's head.

The characteristics of this suspended mirror 60 (the length of the tape or of the pivotally-mounted rod 60B is about 5 millimeters, the height of the projection 60C is about 1 centimeter) are such that when the frame 10 with the suspended mirror 60 is positioned on the wearer's face, the mirror 60A is at an altitude close to the wearer's eye OD, but not exactly the same altitude, so that it does not lie in front of the mirror's eye OD. The distance H2 between the wearer's eye and the center of the mirror is thus preferably less than 10 centimeters.

The operator positions the frame 10 fitted with the suspended mirror 60 on the wearer's face. The wearer may be sitting or standing, with the head straight.

The operator takes hold of the image capture appliance 102 and frames the wearer's face. The operator activates the LED 9 by pressing the trigger button 3 down to a first level and asks the wearer to gaze at the sighting point embodied by the LED 9.

The operator positions the image capture appliance 102 in a first configuration while adjusting the altitude of the image capture appliance 102 so that the reflection 63 of the LED 9 on the suspended mirror 60 is visible in the image 62 of the mirror 60A as viewed on the viewfinder screen 4 of the image capture appliance 102. In a variant, and in particular if a tall mirror is selected, it is advantageous to ensure that the light reflection is adjusted vertically on crosshairs provided on the viewfinder screen 4 to improve adjustment accuracy.

Thereafter, the operator triggers capturing an image by using the trigger button 3.

Alternatively, the operator places the image capture appliance 102 in a second configuration by modifying the angle of inclination of the image capture appliance 102 without modifying its altitude, and then triggers image capture by means of the trigger button 3.

The reflection 63 of the LED 9 is visible in the image only when the pupil 7 of the image capture appliance 102 is at substantially the same altitude as the suspended mirror, and thus substantially at the same altitude as the wearer's eyes OD, OG.

The image is thus captured in a configuration in which the line of observation DO forms an angle lying in the range +5 degrees to −5 degrees with its projection onto a horizontal plane, and in which the image capture appliance 102 is thus at substantially the same altitude as the wearer's eyes OD, OG, thereby eliminating any vertical parallax error.

In addition, since the line of sight DV in this implementation coincides with the line of observation DO, the wearer's line of sight DV is also horizontal, thereby ensuring that the wearer is in a natural orthostatic posture.

As in the first implementation, the image capture appliance 102 then transmits the captured image to the computer 18, which calculates at least one of the looked-for geometrico-physionomic parameters.

Figure 5:
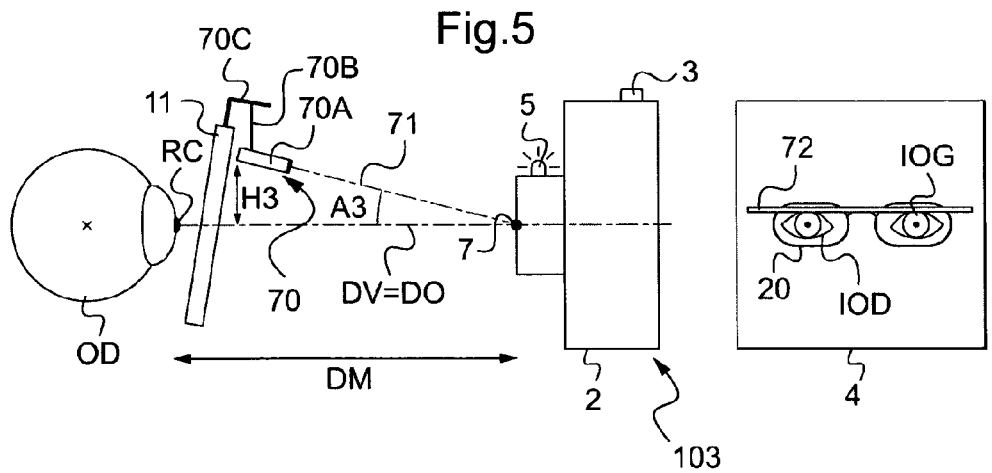

In a third implementation of the first family, shown in FIG. 5, the image capture appliance 103 is similar to the image capture appliance 1 shown in FIG. 2 and is used in the context described with reference to said FIG. 2. It thus comprises a housing 2, a trigger button 3, and means for viewing the image to be captured, including a viewfinder screen 4. It also includes a light source 5, such as an LED, suitable for attracting the wearer's gaze, and having characteristics similar to the LED 5 described for the first implementation.

The frame 10 selected by the wearer is fitted with a pendulumn-suspended light pointer 70. The suspended light pointer 70 comprises a light pointer 70A attached for example to a tape or to a pivotally-mounted rod 70B that is connected to a projection 70C cantilevered out above the frame 10. The suspended light pointer 70 is releasably fastened on the frame 10, e.g. by clip-fastening, or by means of a diadem, or by any other means known to the person skilled in the art.

Alternatively, the suspended light pointer 70 may equally well be mounted directly on the wearer's head.

The light pointer 70A emits a directional light beam 71 having a small aperture angle in the vertical direction, such that the width of the beam in the vertical direction lies for example in the range about 1 millimeter to 10 millimeters at the usual image-capture distance DM that is about 1 meter.

In a variant, it is possible to envisage using a light pointer having a beam that presents a section of small size in both the vertical and the horizontal directions.

The length of the tape or the pivotally-mounted rod 70B is such that when the frame 10 with the suspended light pointer 70 is positioned on the wearer's face, the light pointer 70A is at an altitude close to that of the wearer's eye OD, but not at exactly the same altitude, so as to avoid lying in front of the wearer's eye. The distance A3 between the light pointer 70A and the wearer's eye OD is preferably less than 10 centimeters, and the angle A3 between the light beam 71 emitted by the light pointer 70A and its projection on a horizontal plane preferably lies in the range +6 degrees to −6 degrees. The angle of inclination of the light pointer 70A relative to the horizontal in its equilibrium position, as represented by the angle A3 in FIG. 5, then serves to compensate for the distance H3 between the light pointer 70A and the wearer's eye OD, such that at the usual image-capture distance DM, the light beam 71 is at the same altitude as the pupil 7 of the image capture appliance 103.

The operator positions the frame 10 fitted with the suspended light pointer 70 on the wearer's face. The wearer may be sitting or standing, with the head straight.

The operator takes hold of the image capture appliance 103 and frames the wearer's face. The operator lights the LED 5 by pressing the trigger button 3 down to a first level and asks the wearer to gaze at the sighting point embodied by the LED 5.

The operator positions the image capture appliance 103 while adjusting its altitude so that the image 72 of the suspended light pointer 70 is visible on the viewfinder screen 4 of the image capture appliance 103.

The operator then triggers capture of an image by means of the trigger button 3.

Alternatively, the operator places the image capture appliance 103 in a second configuration by modifying the angle of inclination of the image capture appliance 103 without modifying its altitude, and then triggers image capture by means of the trigger button 3.

The image 72 of the light pointer 70A is visible in the image only when the pupil 7 of the image capture appliance 103 is at substantially the same altitude as the wearer's eyes OD, OG, since the beam 71 is of small dimension in the vertical direction. The fact that the image 72 of the light pointer 70 is visible on the viewfinder screen 4, thus indicates that the pupil 7 of the image capture appliance 103 is at substantially the same altitude as the wearer's eyes OD, OG.

The image is thus captured in a configuration in which the line of observation DO forms an angle lying in the range +5 degrees to −5 degrees with its projection onto a horizontal plane, thereby eliminating any vertical parallax error.

In addition, since the line of sight DV in this implementation coincides with the line of observation DO, the wearer's line of sight DV is also horizontal, thereby ensuring that the wearer is in a natural orthostatic posture.

As in the first implementation, the image capture appliance 103 then transmits the image as captured in this way to the computer 18, which calculates at least one of the looked-for geometrico-physionomic parameters.

In a fourth implementation of said first family, shown in FIG. 6, the image capture appliance 104 is similar to the image capture appliance 1 shown in FIG. 2 and is used in the context described with reference to FIG. 2. It thus comprises a housing 2, a trigger button 3, and means for viewing the image to be captured, including a viewfinder screen 4. It is also fitted with a pendulumn-suspended half-silvered mirror 80A placed in front of the pupil 7 of the image capture appliance 104, and in which the wearer looks at his- or herself.

Alternatively, the image capture appliance 104 may be fitted with a suspended mirror placed close to its pupil 7.

The half-silvered mirror 80A is constituted, for example, by a mirror having a reflection coefficient of 50%. It is of small size, typically 2 to 5 centimeters, and it is connected by a tape or a pivotally-mounted rod 80B for example to a projection 80C cantilevered out from the front face 8 of the image capture appliance 104.

The operator asks the wearer to gaze at the half-silvered mirror 80A, and to say when he or she sees the reflection of his or her eyes in the half-silvered mirror 80A.

The wearer positions the image capture appliance 104 in a first configuration while modifying its altitude until the wearer can see his or her own eyes reflected in the mirror 80A. The operator then triggers image capture by the trigger button 3. Since the mirror 80A is half-silvered, the operator can view the images IOD, IOG of the wearer's eyes OD, OG, together with the image 20 of the eyeglass frame 10 on the viewfinder screen 4 prior to capturing the image.

When the wearer sees his or her own eyes reflected in the mirror 80A, the altitude of the mirror and thus of the pupil 7 of the image capture appliance 104 is identical to that of the wearer's eyes, independently of the angle of inclination of said image capture appliance 104.

The operator then triggers image capture by means of the trigger button 3.

Alternatively, the operator places the image capture appliance 104 in a second configuration by modifying the angle of inclination of the image capture appliance 104 without modifying its altitude, and then triggers image capture by means of the trigger button 3.

In addition, the wearer's line of sight is thus horizontal, thereby ensuring that the wearer is in a natural orthostatic posture.

As in the first implementation, the image capture appliance 104 then sends the image as captured in this way to the computer 18 that calculates at least one of the looked-for geometrico-physionomic parameters.

In a fifth implementation of the first family, as shown in FIG. 7, the image capture appliance 105 is similar to the image capture appliance 1 shown in FIG. 2 and is used in the context described with reference to FIG. 2. It thus comprises a housing 2, a trigger button 3, and means for viewing the image to be captured, including a viewfinder screen 4. It also includes a light source 5 such as an LED, suitable for attracting the wearer's gaze, and having characteristics similar to those of the LED 5 described for the first implementation.

The frame 10 selected by the wearer is fitted with a pendulumn-suspended light object 90. The suspended light object 90 comprises a light object 90A attached by a tape or a pivotally-mounted rod 90B, for example, that is connected to a projection 90C cantilevered out above the frame 10. The suspended light object 90 is releasably secured to a rim 11 of the frame 10, e.g. by clip-fastening, or by means of a diadem, or by any other means known to the person skilled in the art.

The light object 90A is preferably a headpointer of prismatic shape, e.g. made up of two tetrahedra of identical dimensions that are interconnected via their bases. One of the tetrahedra thus points upwards the other downwards. The faces of the two tetrahedra are of different colors. This object is an illuminated object that diffuses ambient light.

Since the object 90A is pendulumn-suspended, its orientation is known and unvarying. The common base of the two tetrahedra is preferably horizontal. The tape or the pivotally-mounted rod 90B connecting the object 90A to the projection 90C lies in a vertical plane of symmetry of the object.

Thus, when the pupil 7 of the image capture appliance 105 is at the same altitude as the illuminated object 90A, the image 91 of the illuminated object 90A viewed on the viewfinder screen 4 presents surfaces of different colors and similar sizes.

In a variant, it is possible to use a cylindrical headpointer, for example. Under such circumstances, when the pupil 7 of the image capture appliance 105 is at the same altitude as the headpointer, it appears in the form of a circle on the image viewed on the viewfinder screen 4. When the pupil 7 of the image capture appliance 105 is not at the same altitude as the headpointer, then it appears in the form of a segment of length that increases with increasing difference in altitude between the pupil 7 and the headpointer.

The length of the tape or the pivotally-mounted rod 90B is such that when the frame 10 fitted with the suspended illuminated object 90 is positioned on the wearer's face, the illuminated object 90A is at an altitude close to the wearer's eye OD, OG, but not at exactly the same altitude, so as to avoid being in front of the wearer's eye. The distance H5 between the center of the illuminated object 90A and the wearer's eye OD is preferably less than 10 centimeters.

In a variant, provision can be made for the angle of inclination of the suspended illuminated object 90 relative to the horizontal to compensate for the distance H5 so as to improve the accuracy with which the altitude of the image capture appliance 105 is adjusted.

The operator positions the frame 10 fitted with the suspended illuminated object 90 on the wearer's face. The wearer is sitting or standing, with the head straight.

The operator takes hold of the image capture appliance 105 and frames the wearer's face. The operator activates the LED 5 by pressing the trigger button 3 down to a first level and asks the wearer to gaze at the sighting point embodied by the LED 5.

The operator positions the image capture appliance 105 in a first configuration by adjusting the altitude thereof so that the image 91 of the illuminated object 90A viewed on the viewfinder screen 4 presents surfaces of different colors and similar sizes.

The operator then triggers image capture by means of the trigger button 3.

Alternatively, the operator places the image capture appliance 105 in a second configuration while modifying the angle of inclination of the image capture appliance 105 without modifying its altitude, and then triggers image capture by means of the trigger button 3.

The image is thus captured in a configuration in which the line of observation DO forms an angle lying in the range +5 degrees to −5 degrees with its projection onto a horizontal plane, and in which the image capture appliance 105 is thus substantially at the same altitude as the wearer's eyes OD, OG, thereby eliminating any vertical parallax error.

In addition, since the line of sight DV in this implementation coincides with the line of observation DO, the wearer's line of sight DV is also horizontal, thereby ensuring that the wearer is in a natural orthostatic posture.

As in the first implementation, the image capture appliance 105 then transmits the image as captured in this way to the computer 18, which calculates at least one of the looked-for geometrico-physionomic parameters.

In a second family of implementations of the method of the invention, the manual positioning of the image capture appliance 200 includes giving the operator information for compensating the tilt angle ALPHA shown in FIG. 9 as formed between the optical axis AO of the image capture appliance 200 and its projection onto the horizontal plane PF.

In a first implementation of this second family, shown in FIGS. 8 and 9, the image capture appliance 200 is an image capture appliance similar to the image capture appliance 1 shown in FIG. 2 and it is used in the context described with reference to FIG. 2. It thus comprises a housing 2, a trigger button 3, and means for viewing the image to be captured, including a viewfinder screen 4. It also includes a light source 5, such as an LED, suitable for attracting the wearer's gaze, having characteristics similar to those of the LED 5 described in the first implementation of the first family of implementations.

The image capture appliance 200 also has on-board means 6 for measuring an angle of inclination, serving to measure the tilt angle ALPHA formed between the optical axis AO of the lens of the image capture appliance 200 and its projection onto the horizontal plane PF. This angle represents the angle of inclination of the image capture appliance 200 about an axis X parallel to the ground and perpendicular to the optical axis AO of the appliance, as shown in FIGS. 8 and 9.

The remarkable point RC of the wearer's face is likewise represented by the pupil of an eye of the wearer.

In this implementation, the image capture appliance 200 is fitted with an on-board electronic tilt meter 6 suitable for supplying the operator with a signal representative of the value taken by the tilt angle ALPHA at any time. For example, it is possible to use a compact tilt meter of the kind including a capacitive sensor (constituting an accelerometer or a gravimeter), a magnetic sensor suitable for measuring the terrestrial magnetic field, or an artificial field. It is also possible to use a position sensing system, such as that sold by the supplier Polhemus, or indeed a gyro such as that sold under the reference ADXRS 614 by the supplier Analog Device, etc.

In a variant, it is possible to envisage using in the same manner a spirit level as a replacement for an electronic tilt meter.

The viewfinder screen 4 of the image capture appliance 200 also has crosshairs formed by a stationary horizontal reticule 41 placed at a predefined vertical position on the viewfinder screen 4, as can be seen in FIGS. 8 and 9.

Before taking any measurement, it is necessary to perform a step of calibrating the tilt meter 6. This calibration step is performed before the first measurement, and there is no need to repeat it before each measurement. To perform the calibration step, a line parallel to the axis X is placed in front of the image capture appliance 200 at the usual image-capture distance DM therefrom, i.e. about 1 meter, and at the same altitude as the sighting point embodied by the LED 5. The image capture appliance 200 is positioned in such a manner that the reticule 41 coincides with said line as viewed on the viewfinder screen 4, and this position is recorded as being the zero position for the tilt meter 6.

Calibration may alternatively be performed in front of a mirror by causing the vertical position of the reticule 41 to coincide with the image of the sighting point on the viewfinder screen 4.

Depending on the vertical position selected for the reticule 41, the tilt angle ALPHA is itself zero at the zero position of the tilt meter 6, as shown in FIG. 8, or else it is not zero at the zero position of the tilt meter 6, as shown in FIG. 9. Either way, the observation line DO connecting the pupil 7 of the image capture appliance 200 to the pupil RC of the wearer's eye OD is horizontal, and the measurement-taking method takes place as described below.

The optician positions the pair of presentation eyeglasses 10 on the wearer's face. The wearer is sitting or standing, with the head straight.

The optician or operator takes hold of the image capture appliance 200 and frames the wearer's face. The operator lights the LED 5 by pressing the trigger button 3 down to a first level and asks the wearer to gaze at the sighting point embodied by the LED 5.

In a first step a) of adjusting altitude, the operator places the image capture appliance 200 in such a manner that the vertical position of the reticule 41 present on the viewfinder screen 4 coincides with the images of the wearer's eyes IOD, IOG as viewed on said viewfinder screen 4.

In a second step b) of adjusting inclination, the operator adjusts the orientation of the image capture appliance 200 while activating measurement of the tilt angle ALPHA in real time by the on-board tilt meter 6. The operator adjusts the position of the image capture appliance 200 so that the angle given by the tilt meter 6 is zero.

A visible and/or audible signal emitted by the tilt meter 6 serves to inform the operator in real time about the inclination of the image capture appliance 200 relative to said zero angle. For example, an adjustment LED 15 placed at a location on the housing that is always visible to the operator, such as the viewfinder screen 4, is of a flashing blue color while the angle of inclination is positive and the image capture appliance 200 is pointing upwards, while it is of a flashing red color while it is pointing downwards. Finally, the adjustment LED 15 is green and steady when the tilt angle ALPHA is zero. The adjustment LED 15 thus informs the operator how to modify the orientation of the image capture appliance 200 in order to reach a zero tilt angle ALPHA: it is necessary to turn the appliance downwards if the adjustment LED 15 is blue and to turn it upwards if the adjustment LED 15 is red. In addition, the frequency of the flashing of the adjustment LED 15 is inversely proportional to the absolute value of the tilt angle ALPHA, thereby informing the operator whether the angle of orientation of the appliance is far away from or close to the zero tilt angle ALPHA.

Once the tilt angle ALPHA has been adjusted, if the vertical position of the images of the eye IOD and IOG on the viewfinder screen 4 continues to coincide with the position of the reticule 41, the operator triggers image capture by means of the trigger button 3.

Alternatively, the operator then modifies the tilt angle ALPHA so as to conserve an identical altitude for the image capture appliance 200 while framing at least the images of the wearer's eyes IOD, IOG and the image of the frame 20 on the image ready to be captured, and then triggers image capture by means of the trigger button 3.

The image is thus captured in a configuration in which the line of observation DO forms an angle lying in the range +5 degrees to −5 degrees with its projection onto a horizontal plane, and in which the image capture appliance 200 is thus at the same altitude as the wearer's eyes OD, OG, thereby eliminating any vertical parallax error, in particular concerning the vertical positioning of the eyes relative to the frame. It can be understood that because of the non-zero distance that exists between the mean plane of the frame 10 and the eyes of the wearer, too great an angle of inclination of the line of observation DO would lead to a vertical parallax error in the captured image.

Furthermore, since the line of sight DV in this implementation coincides with the line of observation DO, the wearer's line of sight DV is also horizontal, thereby ensuring that the wearer is in a natural orthostatic posture.

If the vertical position of the images of the eyes IOD, IOG on the viewfinder screen 4 no longer coincides with the position of the reticule 41, then the operator repeats step a).

In a step c), the image capture appliance 200 transmits the image as captured in this way together with the tilt angle ALPHA at the instant of image capture as measured by the on-board tilt meter 6 to the computer 18, which records them in RAM or in mass memory for processing by the processing and calculation software installed in the computer 18. Such processing is known and is not described in detail herein.

By means of the software for processing the captured image, the computer 18 acts in a step d), in response to the captured image in isolation or in combination with other images captured in other configurations, and possibly also the tilt angles ALPHA at the moments of image capture, to calculate at least one of the looked-for geometrico-physionomic parameters. By way of example, the parameter in question is the height RC of the wearer's pupils relative to the frame 10, the pupillary distance of the wearer, or the pantoscopic angle TETA of the frame 10.

In a first variant forming part of said second family of implementations, the viewfinder screen of the image capture appliance does not have a stationary horizontal reticule placed at a predefined vertical position on the screen. Instead it has a dynamic horizontal reticule that is digitally overlaid on the image displayed by the viewfinder screen 4. The vertical position of the reticule on the viewfinder screen is calculated and updated in real time by an on-board electronic and/or computer device in the image capture appliance as a function of the measurement of the tilt angle ALPHA as given by the electronic tilt meter.

For this purpose, a prior step of calibrating the tilt meter is performed before taking any measurement. An image of a line parallel to the axis X is placed in front of the image capture appliance, at the usual image-capture distance DM of about 1 meter, and at the same altitude as the sighting point embodied by the LED. The image capture appliance is positioned in such a manner that the dynamic reticule coincides with said line as viewed on the viewfinder screen, and this position is recorded as the zero position of the tilt meter. Thereafter, the tilt angle ALPHA of the image capture appliance is modified in order to calibrate the so-called "gain" ratio between movement of the reticule and the angle of inclination as measured by the tilt meter. This gain is a calibrated constant that is a function in particular of the focal length of the image capture appliance.

Provision can be made for an error message to appear on the viewfinder screen if the angle of inclination and/or the altitude of the image capture appliance does not enable the dynamic reticule to be displayed on the viewfinder screen.

In this implementation, the dynamic reticule represents the horizontal plane passing through the sighting point, and the operator then need only position the image capture appliance so as to cause the reticule to coincide with the images of the wearer's eyes on the viewfinder screen by framing the wearer's eyes and eyeglasses on the image and triggering image capture by means of the trigger button, regardless of the tilt angle ALPHA of the image capture appliance. The operator thus performs both steps a) and b) of the first implementation simultaneously. The other steps c) and d) are not modified.

In a second variant forming part of the second family of implementations, as shown in FIG. 10, the viewfinder screen 4 of the image capture appliance 200 does not have a fixed horizontal reticule 41 placed at a predefined vertical position on the screen.

The image capture appliance 200 is fitted with a light pointer 250 that emits a directional light beam 251 with a small aperture angle in the vertical direction, such that the thickness of the beam in the vertical direction lies for example in the range about 1 millimeter to 10 millimeters at the usual image-capture distance DM that is about 1 meter. The orientation of the light pointer 250 is known, and preferably such that the emitted light beam 251 extends in a mean plane parallel to the axis X and to the optical axis AO of the image capture appliance 200. The light pointer 250 is secured to the image capture appliance 200. By way of example, it is positioned at the same altitude as the LED 5 embodying the sighting point. A plane connecting the line of observation DO is then advantageously marked by the light beam 251.

In a variant, it is possible to envisage using a light pointer having a beam that presents a section of dimension that is small in both the vertical and the horizontal directions.

Before taking any measurement, it is necessary to perform a calibration step on the tilt meter 6. This calibration step is performed before the first measurement, and there is no need to repeat it before each measurement. To perform this step, a line parallel to the axis X is placed in front of the image capture appliance 200 at the usual image-capture distance of about 1 meter, and at the same altitude as the sighting point embodied by the LED 5. The image capture appliance 200 is positioned in such a manner that the projection of the light beam 251 on the support of the line coincides with said line, and this position is recorded as being the zero position of the tilt meter 6.

Since the orientation of the light pointer 250 in this implementation is such that the emitted light beam 251 extends in a mean plane parallel to the axis X and to the optical axis AO of the image capture appliance 200, the tilt angle ALPHA is zero when the tilt meter 6 is in its zero position as shown in FIG. 10.

In a variant, depending on the orientation of the light pointer 250 relative to the optical axis AO of the image capture appliance, the tilt angle ALPHA is not zero when the tilt meter 6 is in its zero position.

The operator then takes hold of the image capture appliance 200 and frames the wearer's face. The operator activates the LED 5 by pressing the trigger button 3 to a first level and asks the wearer to gaze at the sighting point embodied by the LED 5. The operator then activates the light pointer 250, which projects a line of light 252 on the wearer's head TP.

In an altitude adjustment first step a), the operator places the image capture appliance 200 in such a manner that the vertical position of the image 253 of said line of light 252 as viewed on the viewfinder screen 4 is identical to the vertical position of the images IOD, IOG of the wearer's eyes as viewed on the viewfinder screen 4.

In a second step b), the operator adjusts the orientation of the image capture appliance 200 by activating real time measurement of the tilt angle ALPHA by the on-board tilt meter 6. The operator adjusts the position of the image capture appliance 200 so that the angle indicated by the tilt meter 6 is zero.

As in the first implementation of said second above-described family, a visible and/or audible signal emitted by the tilt meter 6 is provided to inform the operator in real time about the inclination of the image capture appliance 200 relative to said zero angle.

Once the tilt angle ALPHA has been adjusted, if the image 253 of the line of light viewed on the viewfinder screen 4 is still superposed on the images IOD, IOG of the wearer's eyes as viewed on the viewfinder screen 4, the operator triggers image capture by means of the trigger button 3.

If the vertical position of the images IOD, IOG of the wearer's eyes on the viewfinder screen 4 no longer coincides with the vertical position of the reticule 41, the operator repeats step a).

In a third variant forming part of the second family of implementations, the image capture appliance does not have a light source such as an LED for attracting the wearer's gaze.

The image capture appliance is placed behind a half-silvered mirror in which the wearer can look at his- or herself. The operator asks the wearer to gaze at the reflection of his or her own eyes in the half-silvered mirror. The half-silvered mirror is a mirror that has a reflection coefficient of 50%, for example.

Before taking any measurement, it is necessary to perform a step of calibrating the tilt meter. To do this, the image capture appliance is placed in front of the half-silvered mirror so as to cause the vertical position of the fixed reticule to coincide with the image of the reflection of the pupil of the image capture appliance on the viewfinder screen, and this position is recorded as the zero position of the tilt meter.

Alternatively, this calibration may be performed on the side of the half-silvered mirror where the operator is usually located, providing this face of the mirror possesses a coefficient of reflection of at least 10%.

In the adjustment first step a), the operator is positioned at a distance of about 1 meter from the wearer. The operator places the image capture appliance facing the wearer, on the other side of the half-silvered mirror, such that the vertical position of the reticule present on the viewfinder screen coincides with the images of the wearer's eyes seen through the half-silvered mirror and viewed on the viewfinder screen.

In the second step b), the operator adjusts the orientation of the image capture appliance by activating real time measurement of the tilt angle ALPHA by means of the on-board tilt meter. The operator adjusts the position of the image capture appliance so that the angle indicated by the tilt meter is zero.

As in the first implementation of said second family of implementations, a visible and/or audible signal emitted by the tilt meter is provided to inform the operator in real time about the angle of inclination of the image capture appliance relative to said zero angle.

Once the tilt angle ALPHA has been adjusted, if the vertical position of the reticule present on the viewfinder screen still coincides with the images of the wearer's eyes seen through the half-silvered mirror and viewed on the viewfinder screen, then the operator triggers image capture by means of the trigger button.

If the vertical position of the reticule present on the viewfinder screen no longer coincides with the images of the wearer's eyes seen through the half-silvered mirror and viewed on the viewfinder screen, then the operator returns to step a).

The other steps c), d) of the method take place in the same manner as in the above-described first implementation.

In a variant, it is possible to envisage using a dynamic reticule overlaid physically in the image viewed on the viewfinder screen, or indeed a light pointer which is then projected onto the half-silvered mirror on the image capture appliance side.

In a fourth variant forming part of said second family of implementations, the image capture appliance does not have a light source such as an LED for attracting the wearer's gaze. Nor does the appliance have an on-board tilt meter adapted to provide the operator with a signal representative of the value taken by the tilt angle ALPHA, nor does it have a fixed horizontal reticule placed in a predefined vertical position on the viewfinder screen.

The image capture appliance is placed behind a half-silvered mirror in which the wearer looks at his- or herself. The operator asks the wearer to gaze at the reflection of his or her eyes in the half-silvered mirror. By way of example, the half-silvered mirror has a coefficient of reflection of 50% on the wearer side and of 10% to 25% on the operator side. The operator can thus see his or her own reflection in the half-silvered mirror together with the wearer seen through the half-silvered mirror.

The operator is positioned at a distance of about 1 meter from the wearer. The operator places the image capture appliance facing the wearer on the other side of the half-silvered mirror so that the vertical position of the image of the reflection of the pupil of the image capture appliance on the viewfinder screen coincides with the images of the wearer's eyes seen through the half-silvered mirror and viewed on the viewfinder screen.

This adjustment makes it possible to adjust simultaneously the altitude and the tilt angle of the image capture appliance. Thereafter, the operator triggers image capture by pressing on the trigger button.

In a variant, provision may be made for triggering of image capture to attenuate ambient lighting on the operator side so as to limit the brightness of the reflection of the operator in the captured image.

The other steps c) and d) of the method take place in the same manner as in the first above-described implementation.

It is also possible, in a variant, to envisage using a reticule that is fixed or that is dynamically overlaid digitally in the image viewed on the viewfinder screen, or indeed a light pointer that is then projected onto the half-silvered mirror from the image capture appliance side in order to facilitate framing the wearer's eyes.

In all of the variants of the first implementation of the second family as described above, the method enables the image capture appliance to be placed at the same altitude as the wearer's eyes OD, OG in a plane that is substantially horizontal. This makes it possible to avoid any vertical parallax error. Furthermore, in these variants, the line of observation DO and the line of sight DV coincide. The line of sight DV is likewise horizontal while the image is being captured, thereby ensuring that the wearer is in a natural orthostatic posture.

In a fifth variant forming part of said second family of implementations, the image capture appliance includes a light source such as an LED suitable for attracting the gaze of the wearer, which source is fastened on a lateral arm fitted to the image capture appliance and at a distance therefrom, and representing the sighting point of the image capture appliance.

The position of the sighting point relative to the pupil of the image capture appliance is known and is selected in such a manner that the altitude difference between said sighting point and the pupil of the image capture appliance is such that the line of sight DV forms an angle that is less than or equal to 6 degrees with its projection on a horizontal plane.

The operator and the image capture appliance in this example are not directly in front of the wearer, but are offset a little to one side relative to the wearer.

Nevertheless, the method takes place in the manner described for the first implementation, with steps a), b), c), and d), thereby enabling the operator to place the image capture appliance at the same altitude as the wearer's eyes and to capture an image of the wearer while maintaining the line of observation DO of the image capture appliance horizontal. Nevertheless, under such circumstances, the line of sight DV and the line of observation DO do not coincide, and the wearer might not be in a natural or orthostatic posture.

As in the first implementation, it is possible in a variant to envisage using a dynamic reticule digitally overlaid in the image viewed on the viewfinder screen, or indeed a light pointer projected onto the wearer's face for the purpose of adjusting the altitude and the tilt angle ALPHA of the appliance.

In a fifth variant forming part of the second family of implementations, the image capture appliance does not have a light source such as an LED suitable for attracting the wearer's gaze. In addition to the image capture appliance, the operator also has a sighting point that is embodied by a position-identifying mark, e.g. situated on a wall or on a column that is suitable for being moved. This mark is preferably adjustable in height, or is made up of a plurality of marks at different heights. Alternatively, it may be a mark that is at a distance of more than 5 meters from the wearer to mark the horizon line.

In a variant, a vertical mirror may also be used, the wearer then gazing at the reflection of his or her own eyes in the mirror.

As in the first implementation, the image capture appliance is fitted with an on-board electronic tilt meter suitable for providing the operator with a signal representative of the value taken by the tilt angle ALPHA at all times.

In a variant, it is possible to envisage using a spirit level in the same manner as a replacement for the electronic tilt meter.

The viewfinder screen of the image capture appliance includes a fixed horizontal reticule that is placed at a predefined vertical position on the screen.

Before taking any measurements, it is necessary to perform a step of calibrating the tilt meter. This calibration step is performed before the first measurement, and there is no need to perform it before each measurement. For this step, the image capture appliance is placed at the usual image-capture distance DM of about 1 meter and at the same altitude as that selected for the mark used as a sighting point. The image capture appliance is positioned in such a manner that its reticule coincides with the mark as viewed on the viewfinder screen, and this position is recorded as the zero position of the tilt meter.

This calibration may alternatively be performed in front of a mirror by causing the vertical position of the reticule to coincide with the image of the reflection of the pupil of the image capture appliance on the viewfinder screen.

Depending on the vertical position selected for the reticule, the tilt angle ALPHA is either zero when the tilt meter is in its zero position, or is non-zero when the tilt meter 6 is in its zero position. Either way, the line of observation DO connecting the sensor of the image capture appliance with the pupil RC of the wearer's eye OD is horizontal, and the measurement-taking method takes place in the manner described below.

The operator places the pair of presentation eyeglasses 10 on the wearer's face. The wearer is sitting or standing with the head straight, facing the wall carrying the mark that is used as a sighting point. The operator takes hold of the image capture appliance and frames the wearer's face. The operator asks the wearer to gaze at the mark being used as the sighting point. The operator and thus the image capture appliance are therefore in a position that is offset to one side relative to the wearer so that the wearer can gaze at the mark on the wall.

The method then takes place in the manner described for the first implementation of said second family, by means of the steps a), b), c), and d).

In a variant, as in the first implementation of said second family, it is possible to envisage using a dynamic reticule overlaid digitally in the image viewed on the viewfinder screen, or indeed a light pointer projected onto the wearer's face in order to adjust the altitude and the tilt angle ALPHA.

The present invention is not limited in any way to the implementations described and shown, and the person skilled in the art knows how to make any variant in accordance with its spirit.

By way of example, characteristic points of the wearer's face other than the wearer's eye may be used for adjusting the image capture appliance.

In addition, the operator may for example perform step b) of adjusting the tilt angle ALPHA before performing step a) of adjusting the altitude of the image capture appliance in each implementation or variant in which those two steps are distinct. With practice, the operator can thus perform both of those steps simultaneously.

The invention claimed is:

1. A method of measuring at least one geometrico-physionomic parameter (H, TETA) concerning the positioning on the face of a wearer of a frame (10) for vision-correcting eyeglasses, the method comprising capturing at least one digital image of the wearer's face wearing the frame (10) by using an image sensor such as an image capture appliance (1; 101; 102; 103; 104; 105; 200), and processing the captured image to determine the geometrico-physionomic parameter (H, TETA), the method being characterized in that the image capture appliance (1; 101; 102; 103; 104; 105; 200) is of the portable type held in the hand by an operator, and prior to capturing an image, the operator manually positions the image capture appliance (1; 101; 102; 103; 104; 105; 200) in a first configuration in which a line of observation (DO) connecting the pupil (7) of the image capture appliance (1; 101; 102; 103; 104; 105; 200) to a predetermined remarkable point (RC) directly or indirectly associated with the wearer's face or with the frame is substantially horizontal, and in that the image is captured in a second configuration of the image capture appliance (1; 101; 102; 103; 104; 105; 200) identical to or distinct from the first configuration, such that the altitude of said image capture appliance (1; 101; 102; 103; 104; 105; 200) is identical to its altitude in the first configuration, and in that the calculation of the geometrico-physionomic parameter (H, TETA) includes identifying, in the image, the image of the predetermined remarkable point (RC).

2. A method according to claim 1, wherein, in order to position the image capture appliance (101; 102; 103; 104; 105) in the first configuration, the operator adjusts the altitude of the image capture appliance (101; 102; 103; 104; 105) by means of a visual assistance device including at least one illuminated object pendulumn-suspended either from the image capture appliance (101; 102; 103; 104; 105), or directly or indirectly from the wearer's head (TP).

3. A method according to claim 2, wherein the illuminated object is an active source (70A) of extent that is limited at least in the vertical direction, or a reflecting object pendulumn-suspended directly or indirectly from the wearer's head (TP), the operator views an image to be captured in real time on viewing means (4) of the image capture appliance (103), and the operator adjusts the altitude of the image capture appliance (103) in such a manner that the image of said illuminated object is visible on the image to be captured.

4. A method according to claim 2, wherein, the illuminated object is an active source or a light-diffusing object (90A) pendulumn-suspended directly or indirectly from the wearer's head (TP), the operator views an image to be captured in real time on the viewing means (4), and the operator adjusts the altitude of the image capture appliance (105) in such a manner that the image of the illuminated object (90A) is visible in the image to be captured, and the image of said illuminated object viewed on the viewing means (4) presents geometrical characteristics of predefined shapes and/or dimensions and/or colors.

5. A method according to claim 3, wherein the illuminated object (60A; 70A) is situated at a distance (H2; H3; H5) of less than 10 centimeters from the wearer's eyes, or such that an orientation line connecting an optical center of said illuminated object and the pupil of the image capture appliance placed at the same altitude as the wearer's eyes forms an angle lying in the range +5 degrees to −5 degrees with its projection onto a horizontal plane.

6. A method according to claim 2, wherein the illuminated object is a reflecting object (80A) that is pendulumn-suspended from the image capture appliance (104) and that is situated in front of or close to the pupil (7) of the image capture appliance (104), and the operator adjusts the altitude of the image capture appliance (104) in such a manner that the wearer sees the reflection of his or her own eyes in said reflecting object (80A).

7. A method according to claim 6, wherein the reflecting object is a half-silvered mirror (80A) placed in front of the pupil (7) of the image capture appliance (104), and the operator adjusts the altitude of the image capture appliance (104) in such a manner that the wearer sees the reflection of his or her own eyes in said half-silvered mirror (80A).

8. A method according to claim 2, wherein the illuminated object is an active light source (50A) that is pendulumn-suspended from the image capture appliance (101), and the operator adjusts the altitude of the image capture appliance (101) by adjusting the altitude of the projection onto the wearer's face of the light beam emitted by the illuminated object relative to the remarkable point (RC) of the wearer's face.

9. A method according to claim 2, wherein the illuminated object is an active light source (50A) that is pendulumn-suspended from the image capture appliance (101), the operator views in real time an image to be captured on the viewing means (4), and the operator adjusts the altitude of the image capture appliance (101) by adjusting the vertical position on the image to be captured of the image of the projection onto the wearer's face of the light beam emitted by the illuminated object relative to the image of the remarkable point (RC) of the wearer's face.

10. A method according to claim 2, wherein the visual assistance device includes an active light source (9) that is pendulumn-suspended from the image capture appliance (102) and a reflecting object (60A) pendulumn-suspended directly or indirectly from the wearer's head (TP), the operator views in real time an image to be captured on the viewing means (4), and the operator adjusts the altitude of the image capture appliance (102) in such a manner that the reflection of said active light source (9) on said reflecting object is visible in the image to be captured.

11. A method according to claim 1, wherein the manual positioning of the image capture appliance (200) includes delivering information to the operator for compensating the tilt angle (ALPHA) formed between an optical axis (AO) of the image capture appliance (200) and its projection onto a horizontal plane (PF).

12. A method according to claim 11, wherein the manual positioning of the image capture appliance (200) comprises the following substeps:
 a1) measuring the tilt angle (ALPHA) by means of on-board tilt-measuring means (6) fitted to the image capture appliance (200);
 a2) the operator adjusting said tilt angle; and
 a3) the operator viewing in real time an image to be captured on the viewing means (4), the operator adjusting the altitude of the image capture appliance (200) to adjust the vertical position of a remarkable point of the image to be captured of the wearer's face viewed by the operator on the viewing means (4) relative to a reference of the viewing means or relative to the image of the projection on the wearer's face of an active light pointer (250) secured to the image capture appliance (200) to a given value, which given vertical position value is defined on calibration or dynamically as a function of the tilt angle (ALPHA) after adjustment.

13. A method according to claim 11, wherein, for manual positioning of the image capture appliance (200), the operator adjusts the tilt angle (ALPHA) and said vertical position of the remarkable point of the image to be captured to have predetermined values.

14. A method according to claim 11, wherein, for manual positioning of the image capture appliance (200), information means (15) depending on the on-board tilt-measuring means (6) inform the operator about the angular position of the image capture appliance (200) relative to a predetermined value for the tilt angle (ALPHA).

15. A method according to claim 14, wherein said predetermined value for the tilt angle (ALPHA) is zero.

16. A method according to claim 12, wherein the altitude of the image capture appliance (200) is adjusted by putting crosshairs (41) placed on the viewing means (4) into the same vertical position as the remarkable point of the image to be captured of the wearer's face viewed by the operator on the viewing means (4).

17. A method according to claim 16, wherein said crosshairs are dynamically inlaid by digital display means forming part of the viewing means (4), on the image to be captured at a vertical position that is adjusted in real time by digital processing as a function of the tilt angle (ALPHA) measured by the on-board inclination-measurement means (6).

18. A method according to claim 12, wherein the altitude of the image capture appliance (200) is adjusted by putting the image of the projection on the wearer's face of an active pointer (250) secured to the image capture appliance (200) into the same vertical position as the remarkable point of the image to be captured of the wearer's face viewed by the operator on the viewing means (4).

19. A method according to claim 1, wherein the wearer gazes at a sighting point (5; 9) that, together with one of the wearer's eyes (OD), forms a line of sight (DV) that is substantially horizontal.

20. A method according to claim 19, wherein the sighting point (5; 9) is carried by the image capture appliance (101; 102; 103; 105; 200) and is vertically separated from the pupil (7) of the image capture appliance (101; 102; 103; 105; 200) by a height of less than 10 centimeters, or such that in the first configuration, the line of sight (DV) forms an angle less than or equal to 6 degrees with its projection onto a horizontal plane.

21. A method according to claim 4, wherein the illuminated object (90A) is situated at a distance (H2; H3; H5) of less than 10 centimeters from the wearer's eyes, or such that an orientation line connecting an optical center of said illuminated object and the pupil of the image capture appliance placed at the same altitude as the wearer's eyes forms an angle lying in the range +5 degrees to −5 degrees with its projection onto a horizontal plane.

* * * * *